United States Patent [19]
Liang

[11] Patent Number: 5,867,586
[45] Date of Patent: Feb. 2, 1999

[54] APPARATUS AND METHODS FOR FLUORESCENT IMAGING AND OPTICAL CHARACTER READING

[75] Inventor: Louis H. Liang, Los Altos, Calif.

[73] Assignee: Angstrom Technologies, Inc., Erlanger, Ky.

[21] Appl. No.: 863,846

[22] Filed: May 27, 1997

Related U.S. Application Data

[62] Division of Ser. No. 265,399, Jun. 24, 1994, Pat. No. 5,719,948.
[51] Int. Cl.$^6$ ....................................................... G06K 9/00
[52] U.S. Cl. .............................. 382/112; 382/321; 380/23
[58] Field of Search ................................... 382/112, 321; 380/23, 54, 59; 250/365; 235/462

[56] References Cited

U.S. PATENT DOCUMENTS

| | | | |
|---|---|---|---|
| Re. 27,770 | 10/1973 | Siegel | 235/61.11 E |
| 3,473,027 | 10/1969 | Freeman et al. | 250/71 |
| 3,500,047 | 3/1970 | Berry | 250/71 |
| 3,573,472 | 4/1971 | Madalo | 250/219 |
| 3,663,813 | 5/1972 | Shaw | 250/71 R |
| 3,691,350 | 9/1972 | Kuhn et al. | 235/61.7 B |
| 3,735,094 | 5/1973 | Dunn | 235/61.11 E |
| 3,764,978 | 10/1973 | Tyburski et al. | 340/146.3 D |
| 4,146,792 | 3/1979 | Stenzel et al. | 250/365 |
| 4,202,491 | 5/1980 | Suzuki | 235/491 |
| 4,202,626 | 5/1980 | Mayer, Jr. et al. | 355/52 |
| 4,451,521 | 5/1984 | Kaule et al. | 428/199 |
| 4,538,059 | 8/1985 | Rudland | 235/468 |
| 4,642,526 | 2/1987 | Hopkins | 315/244 |
| 4,683,371 | 7/1987 | Drexler | 235/487 |
| 4,694,148 | 9/1987 | Diekemper et al. | 235/468 |
| 4,757,188 | 7/1988 | Nakarai et al. | 235/454 |
| 4,758,716 | 7/1988 | Mayer et al. | 235/470 |
| 4,873,427 | 10/1989 | Virdia | 235/492 |
| 4,882,195 | 11/1989 | Butland | 427/1 |
| 4,889,365 | 12/1989 | Chouinard | 283/70 |

(List continued on next page.)

OTHER PUBLICATIONS

W. J. Fant et al., "Infrared Transparent Credit Card" IBM Technical Disclosure Bulletin, vol. 9 No. 7 (Dec. 1966) p. 870.

Primary Examiner—Jose L. Couso
Assistant Examiner—Anh Hong Do
Attorney, Agent, or Firm—Theodore R. Touw

[57] ABSTRACT

An authentication system combines a source of ultraviolet light (and optionally a scanning mechanism) with apparatus for capturing and recognizing either graphic images or characters or both, where the graphic images and/or characters have been previously made with fluorescent substances that may be invisible under ordinary visible light, but are rendered detectable by the ultraviolet light. As in conventional optical character recognition (OCR), the characters may be conventional alphanumeric characters readable by human readers once they are made visible. The authentication system has a housing enclosing its optical path, a source of UV light, a detector for detecting graphic images or characters, conversion of the detector signal to digital form, a memory storing predetermined indicia, recognition logic, and indicating means. The system may also include a scanning mechanism and optical filters to select predetermined wavelengths of fluorescent light. The detector may be capable of detecting both fluorescent images and normal visible images, and the authentication system may incorporate switching mechanisms to allow multiplexed acquisition of fluorescent and normally visible images. The authentication system can operate in conjunction with a process for marking articles with indicia selected from a predetermined set of graphic images and characters readable by optical character recognition and/or by image comparison. That process can include printing fluorescent graphic images or characters in registration with (or with predetermined offset from) visible images or characters or indicia printed with substances fluorescent at different wavelengths. The recognition logic of the authentication system can include comparison of fluorescent and visible images or two different fluorescent images with each other. Pairs of indicia to be recognized and/or compared may be arranged to constitute a stereogram or other arrangement for first-order authentication by a human observer.

17 Claims, 3 Drawing Sheets

5,867,586
Page 2

U.S. PATENT DOCUMENTS

| | | | |
|---|---|---|---|
| 4,889,367 | 12/1989 | Miller | 283/88 |
| 4,897,531 | 1/1990 | Someya et al. | 235/440 |
| 4,906,988 | 3/1990 | Copella | 340/825.34 |
| 4,908,516 | 3/1990 | West | 250/556 |
| 4,921,280 | 5/1990 | Jalon | 283/88 |
| 4,983,817 | 1/1991 | Dolash et al. | 235/462 |
| 5,030,832 | 7/1991 | Williams et al. | 250/458.1 |
| 5,064,221 | 11/1991 | Miehe et al. | 283/67 |
| 5,095,194 | 3/1992 | Barbanell | 235/379 |
| 5,105,269 | 4/1992 | Nakamura et al. | 358/98 |
| 5,118,349 | 6/1992 | Jalon | 106/21 |
| 5,120,088 | 6/1992 | Radcliffe et al. | 283/67 |
| 5,159,398 | 10/1992 | Maekana et al. | 356/73 |
| 5,167,021 | 11/1992 | Needham | 395/275 |
| 5,210,411 | 5/1993 | Oshima et al. | 250/271 |
| 5,212,558 | 5/1993 | Obata et al. | 358/296 |
| 5,231,276 | 7/1993 | Yoshihara | 235/454 |
| 5,266,784 | 11/1993 | Trotta et al. | 235/375 |
| 5,270,526 | 12/1993 | Yoshihara | 235/487 |
| 5,280,333 | 1/1994 | Wunderer | 356/71 |
| 5,331,140 | 7/1994 | Stephany | 235/462 |
| 5,334,823 | 8/1994 | Noblett, Jr. et al. | 235/380 |
| 5,418,855 | 5/1995 | Liang et al. | 380/23 |

APPARATUS AND METHODS FOR FLUORESCENT IMAGING AND OPTICAL CHARACTER READING

This application is a division of application Ser. No. 08/265,399, filed Jun. 24, 1994 U.S. Pat. No. 5,719,948.

CROSS-REFERENCE TO RELATED APPLICATIONS

This invention is related to a commonly assigned co-pending patent application by Liang et al. entitled "Authentication System and Method," Ser. No. 08/127,250, filed Sep. 27, 1993, U.S. Pat. No. 5,418,855.

FIELD OF THE INVENTION

This invention relates generally to systems for authenticating articles, methods for authenticating articles, and processes for marking articles for later authentication. This invention relates particularly to mechanisms and methods for detecting indicia which may include graphic images and/or characters and for comparing the detected indicia with predetermined indicia to verify the articles' authenticity if the detected indicia are recognized. This invention relates more particularly to detection, discrimination, and recognition of fluorescent indicia rendered detectable by illumination of articles with ultraviolet light.

BACKGROUND OF THE INVENTION

PROBLEMS SOLVED BY THE INVENTION

The counterfeiting of articles of many kinds has become a serious problem worldwide, causing great loss of revenues to legitimate businesses and to individuals. Counterfeiting has produced articles that are very difficult to distinguish from the genuine articles, taking sales revenues from the producers of genuine articles and impacting legitimate business' reputations when the counterfeit articles have inferior quality and/or non-existent manufacturers' support. Similarly, problems and losses occur due to counterfeiting of articles used for financial transactions or identification, such as credit cards, drivers' licenses, passports, and immigration documents. Even when genuine articles have been marked with authentication markings such as watermarks, special papers, and holograms which are difficult to replicate, counterfeiters have managed to produce articles that appear genuine. The general availability of newer replication technology such as high-resolution image scanners, laser copiers and printers, and color-accurate color copiers and printers has enabled counterfeiters to produce more credible counterfeit articles. These technological developments of replication hardware continue to make rapid progress, as do the computer hardware and software that support them. Thus it is useful to have additional ways to mark articles for authentication with greater security. Greater security may be achieved by making authentication markings more difficult for counterfeiters to detect and interpret, by incorporating greater complexity into the markings, and by making replication by counterfeiters more difficult. Combining multiple kinds of marking indicia can further increase the complexity of detection, interpretation, and replication, thus providing even better security. Considering the security issue from another point of view, it is not desirable to use the same means that generated the visible appearance of an article to authenticate it, as the visible appearance is becoming easier to replicate. Invisible indicia that cannot be reproduced by common visible graphic copying and printing means can provide improved security, especially when combined with complex images, patterns, and/or characters.

NOTATIONS AND NOMENCLATURE

In this specification, the following terms or abbreviations are used with the meanings listed here:

CCD—charge coupled device

DSP—digital signal processor excitation time—a characteristic time for a fluorescent emission to be excited after ultraviolet illumination of a fluorescent substance begins extinction time—a characteristic time for a fluorescent emission to decay exponentially from its initial emission intensity $I_O$ to intensity $I_O/e$ IR—light in the infrared portion of the spectrum OCR—optical character recognition UV—light in the ultraviolet portion of the spectrum visible/IR—light either entirely in the visible portion or entirely in the infrared portion, or partly in both visible and infrared portions of the spectrum visible/UV—light either entirely in the visible portion or entirely in the ultraviolet portion, or partly in both visible and ultraviolet portions of the spectrum

DESCRIPTION OF THE RELATED ART

Many methods have been known to authenticate valuable articles. Some known methods include imprinting a white-light hologram or imprinting reflective and diffractive indicia which display distinctive images that are difficult to counterfeit. Other known methods include incorporation of distinctive fibers into the articles, such fibers being detectable by visual observation, microwave irradiation, or other means. U.S. Pat. No. 4,921,280 describes fibers made luminescent by a dyeing process employing rare-earth compounds, which fibers may be incorporated into articles requiring authentication.

It is knows that documents may be authenticated by marking the documents with substances such as inks or dyes that appear invisible or relatively unnoticeable to the naked eye in ordinary visible illumination, but that fluoresce when illuminated with ultraviolet light, revealing marks that serve to identify the legitimate document. These methods depend on substances that are not easily or inexpensively identified by a counterfeiter, and not easily or inexpensively duplicated or mimicked by a counterfeiter. When using these methods, it is desirable to use substances such as dyes or inks that fluoresce in narrow spectral bands which are distinguishable by sufficiently narrow-band detectors, but not readily distinguishable by eye. In U.S. Pat. No. 4,146,792 by Stenzel et al., these methods are extended to include dyes containing rare-earth elements whose fluorescence is influenced by the chemical environment of the fluorescing atoms in a non-fluorescing matrix, and the detection is refined to include detection of predetermined fine structure in the line spectrum of emitted light. Yet another class of authentication methods uses substances which fluoresce in the infrared portion of the electromagnetic spectrum when illuminated by light in the visible portion of the spectrum.

In U.S. Pat. No. 4,642,526 by Hopkins and assigned to the assignee of the present invention, a source of ultraviolet light is made self-modulating at a predetermined frequency. Detection of the secondary radiation, filtering of the detected signal, and demodulation of the filtered signal at the predetermined frequency allow the system of Hopkins' invention to detect the fluorescent marks despite interference from ambient light sources.

Marking products with indicia such as bar codes using fluorescent substances such as inks or dyes is also known in the prior art, both for the purposes described above and for providing identification on the products without detracting from the products' appearance as normally viewed in visible light. U.S. Pat. No. 4,983,817 by Dolash et al. describes methods and apparatus for reading bar codes printed with fluorescent substances, while compensating for variations in background reflectance over the area printed with the bar code. U.S. Pat. No. 5,064,221 by Miche et al. shows the use of fluorescent substances added to ink ribbon used for printing original documents, in order to distinguish the originals from copies. In many of the known authentication methods using fluorescence, the fluorescent identifying substance may be incorporated into the article during the article's manufacture. In U.S. Pat. No. 4,451,521 by Kaule et al., for example, luminophores are incorporated into paper during its manufacture. Some of the fluorescent substances used in the prior art for authentication purposes contain heavy metals, which are not as safe or environmentally benign as substances not containing such heavy metals. While fluorescent substances have been used in many ways in the prior art to mark articles with indicia for interpretation by human observers, to our knowledge neither optical character recognition (OCR) systems nor image verification systems have been combined with fluorescent markings and UV light illumination to provide improved authentication methods.

The technology of automatic pattern recognition is described in a large body of literature including numerous patents, especially in the application area of optical character recognition (OCR). Many of the recent developments in OCR technology (especially in recognition logic software) are usable with the present invention albeit with some adaptation to the type of light source and to such contrast conditions as may differ from those encountered with conventional OCR scanners having conventional visible/IR light sources.

OBJECTS AND ADVANTAGES OF THE INVENTION

It is an object of this invention to provide an improved authentication system which can detect and recognize complex authenticating indicia such as graphic images and alphanumeric characters. It is another object of the invention to provide an authentication system which can be readily automated to provide authentication that does not depend on human subjective judgment. It is another object of the invention to combine the use of substances which fluoresce under UV illumination, detectors capable of detecting fluorescent radiation, and image or character recognition techniques to enable the creation and authentication of articles with improved security. Another object of the invention is to enable the use of character or image indicia for authentication printed with substances that are safer and less likely to harm the environment than substances containing heavy metals. Another object of the invention is to enable the use of character or image indicia for authentication printed with substances that have sufficiently short extinction times to enable fast scanning. Another object is to enable capture of complex indicia without undue loss of resolution or smearing of details. Another object is to enable robust identification of articles of mail using mail bar codes such as "PostNET" codes printed with fluorescent substances. Another object of the invention is to enable the use of fluorescent indicia for authentication that are more complex than bar codes or simple arrays of dots and/or lines, and that allow a higher density of information per unit area than conventional bar codes. Another object is to provide an authentication system that makes counterfeiting and fraudulent labeling of articles including documents more difficult and expensive to accomplish. Another object is to provide a system that can mark articles for authentication without unduly compromising their aesthetic appearance. Another object is to provide authentication marks that are not easily removed. Another object is to provide flexible methods of authenticating articles that can be practiced in the field of use without requiring special printing press equipment. Another object is to provide an authentication system that can be re-programmed by a user to use various authentication criteria within its range of graphic image and character recognition capabilities.

SUMMARY OF THE INVENTION

An authentication system in accordance with this invention combines a source of ultraviolet light (and optionally a scanning mechanism) with apparatus for capturing and recognizing either graphic images or characters or both, where the graphic images and/or characters have been previously made with fluorescent substances that may be invisible under ordinary visible light, but are rendered detectable by the ultraviolet light. As in conventional optical character recognition (OCR), the characters may be conventional alphanumeric or other natural-language characters readable by human readers once they are made visible.

The authentication system has a housing enclosing its optical paths, a source of at least UV light, a detector for detecting graphic images or characters, conversion of the detector signal to digital form, a memory storing predetermined indicia, recognition logic, and indicators. The system may also include a scanning mechanism and optical filters to select predetermined wavelengths of fluorescent light. The detector may be capable of detecting both fluorescent images and normal visible images, and the authentication system may incorporate switching mechanisms to allow multiplexed acquisition of fluorescent and normally visible images produced by visible/IR or visible/UV illumination.

The authentication system can work in conjunction with processes performed in accordance with this invention, for marking articles with indicia selected from a predetermined set of graphic images and characters readable by optical character recognition and/or by image comparison. That process can include printing fluorescent graphic images or characters in registration (or in predetermined mis-registration) with substantially identically-formed images or characters previously printed with visible substances and/or with fluorescent substances of different characteristic fluorescent wavelength. The recognition logic of the authentication system can include comparison of these two (fluorescent and visible/IR, fluorescent and visible/UV, or two different fluorescent) images with each other. The process can also include printing fluorescent graphic images or characters with a multiplicity of fluorescent substances having distinct fluorescent wavelengths and excitation or extinction times, and printing those in overlay with registration or with predetermined registration offset. The registration offset may be selected to produce a predetermined stereo image when properly viewed by a human observer, thus allowing "first order" authentication by visual inspection using suitable filters. Similar first order authentication may be provided by printing graphic image or character indicia which are both fluorescent and partially visible without UV illumination. Another overlay method uses two graphic images or character indicia, each incomplete in itself, with unconnected but complementary segments. When the two complementary segments are combined with appropriate registration, a complete recognizable graphic image, word, or natural language phrase is formed.

Other objects, uses, advantages and features of the invention will become apparent to those skilled in the art from the following descriptions of preferred embodiments.

DETAILED DESCRIPTION OF THE PREFERRED EMBODIMENTS

The authentication system of the present invention as considered from one point of view combines as major elements a UV light source 10 for illuminating articles to be authenticated and for excitation of fluorescent radiation, a detector 40 for detecting fluorescent radiation from indicia on the articles, and recognition logic 70 for recognizing indicia marked on the articles. Recognition logic 70 uses known methods of character recognition, such as template matching or feature extraction (topological feature analysis), to recognize characters or graphic images, which may include bar codes. The purposes of these elements and others and the relationships among them will become clear by reference to the drawings in conjunction with the following more detailed description.

Figure 1:
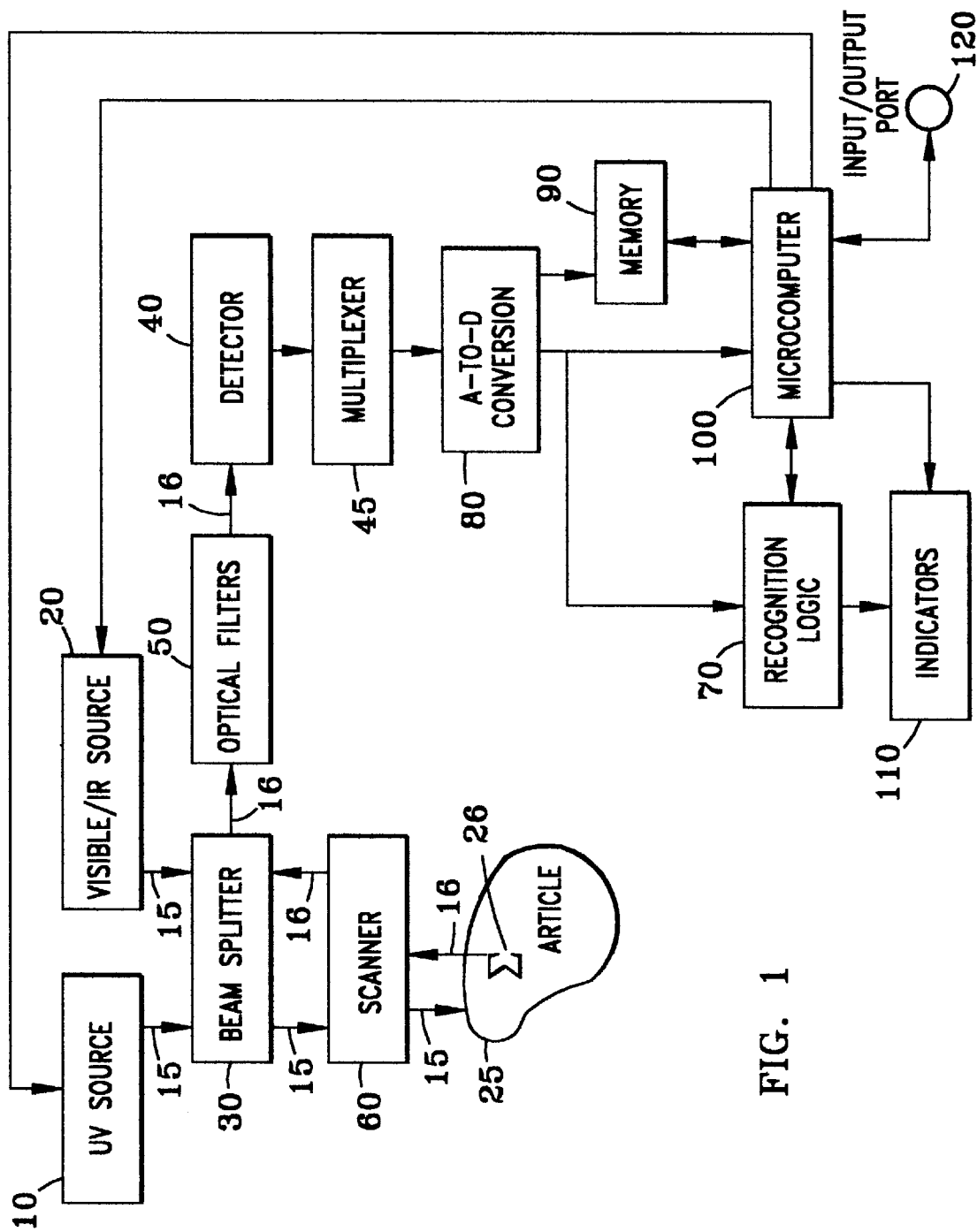
FIG. 1 is a functional block diagram of an embodiment of an authentication system in accordance with the invention.

FIG. 1 shows a functional block diagram of an embodiment of an authentication system in accordance with the invention. Microcomputer 100 controls the overall operation of the authentication system in FIG. 1. FIG. 1 is intended to illustrate an overall architecture or system organization of such an authentication system. Other embodiments may vary in some details of their organization, as will be seen from the descriptions of other embodiments below. For example, in some embodiments, the functions of both recognition logic 70 and microcomputer 100 may be performed by a single digital signal processor 95 (not shown in FIG. 1, but shown performing various functions in FIGS. 2 and 3).

In FIG. 1 a UV source 10 generates ultraviolet light with which to illuminate articles to be tested for authenticity. UV source 10 may be a strobe lamp, and is preferably a high-intensity modulated lamp. In particular it may be a self-modulating lamp and associated circuit, as disclosed in U.S. Pat. No. 4,642,526 by Hopkins, the disclosure of which is hereby incorporated by reference. Light from UV source 10 passes first along an illumination portion 15 of optical path which extends to an article 25 to be authenticated. The light may pass through a beam splitter 30 and a scanner 60 before impinging on article 25 under test. The apparatus may also include an optional visible/IR source 20 whose purpose is described below. Beam splitter 30 passes light from either UV source 10 or both sources 10 and 20 along illumination portion 15 of optical path toward the articles, and passes light returned from article 25 along a return portion 16 of optical path toward detector 40. If article 25 has been marked with fluorescent indicia 26, at least some of the light returning along return portion 16 of optical path will be fluorescent light from indicia 26. Beam splitter 30 may be a partially-reflective mirror or prism or a beam splitter of any type that can pass both UV light and the fluorescent light. If visible/IR source 20 is used, then beam splitter 30 must also pass visible/IR light. Optical filters 50 may be used in the return portion 16 of the optical path to select portions of the spectrum for detection. Filters 50 may be movable into and out of return portion 16 of optical path. For some applications it is desirable to insert other optical filters 50 (not shown) into illumination portions 15 of optical path between sources 10 and/or 20 and beam splitter 30, to select portions of the UV and/or visible/IR spectra with which to illuminate article 25. If illumination portions 15 and return portions 16 of the optical path are separated by other means, or allowed to intermix, beam splitter 30 may be omitted. For applications in which articles 25 to be authenticated are transported past the authentication system, an integral scanner 60 may not be needed and may be omitted. Otherwise integral scanner 60 scans the illuminating beam over the articles or over a selected portion of each article containing graphic image or character indicia. Scanner 60 may be a set of oscillating mirrors scanning in a two-dimensional raster for example. It will be understood by those skilled in the art that, for example, when article 25 is to be moved past the apparatus, the motion of article 25 may substitute for one direction of scan, and a detector 40 consisting of a linear array of sensors oriented perpendicular to the motion may obviate the need for a second direction of scan. If detector 40 is a single discrete photodiode, a full two-dimensional scan is needed to acquire graphic image or character data, or one of the directions of scan may be replaced with a linear motion of article 25. Thus a wide variety of arrangements is possible with various kinds of detectors 40 and with various forms of relative motion between the authentication apparatus and article 25.

In most applications, speed of authentication is desirable, and therefore fast detectors 40 and fast scanners 60 (if used) are desirable. This also has implications for selection of fluorescent materials with which to mark indicia 26 on articles 25, to allow for fast scanning without undue loss of resolution or undue smearing of fine details of image or character indicia 26. The selected fluorescent materials preferably have short extinction time (preferably less than 10 microseconds). In embodiments having a modulated UV source 10, the frequency of modulation is preferably selected to take into account the excitation time of fluorescence of indicia 26. If UV source 10 is a strobe lamp type, the duration and frequency of strobe illumination are preferably selected to take into account the excitation time. Conventional means such as switches or potentiometers controlling time-constant circuits (not shown) or program instructions of microcomputer 100 are used for controlling light source modulation frequency.

Detector 40 may be a photodiode array, a CCD video camera or other detector capable of detecting fluorescent light from tested articles at the desired speed. Preferred detectors are those types that are commonly used with conventional OCR readers, preferably those that they can efficiently detect the fluorescent light. For example CCD detectors such as the ICX or ILX Series available from the Sony Corporation may be used. If detector 40 has an analog output signal, then analog-to-digital conversion circuit 80 is needed to convert that signal to digital form. It will be readily recognized by those skilled in the art that the digital form may be a binary-coded signal. Of course if detector 40 produces a digital output directly, then A-to-D conversion circuit 80 is not needed. In some embodiments of the authentication system, detector 40 may comprise a subsystem with two or more physical detector elements (not shown), each sensitive to a limited spectral range, and connected to A-to-D conversion circuit 80 (if needed) or to memory 90 through a multiplexer 45. In this type of configuration, outputs of various detector elements are multiplexed for input to suitable separate memory addresses for comparison with each other and/or with predetermined graphic image or character data by recognition logic 70.

A digital representation of the detected fluorescent signal data may be stored in memory 90 for comparison with predetermined image or character data previously stored in memory 90 or in a similar memory within microcomputer 100. Microcomputer 100 may be a 68020 microcomputer, for example, available from Motorola, Inc. along with appropriate support circuitry. Microcomputer 100 operates according to program instructions stored in an internal memory or in memory 90 to control the authentication apparatus, including recognition logic 70. While recognition logic 70 is shown as a separate entity in the functional block diagram of FIG. 1, it will be appreciated that it may be incorporated into microcomputer 100, either as dedicated logic hardware or as instructions in the stored program of microcomputer 100. Either recognition logic 70 or microcomputer 100 or both can activate indicators 110 to indicate the result of an authentication test. Microcomputer 100 has at least one input/output port 120 through which predetermined graphic image or character data may be loaded or changed, and microcomputer 100's program may be loaded and/or changed. Recognition logic 70, which may be implemented by a program of microcomputer 100, uses known methods for comparing characters or graphic images with predetermined characters or images.

Many methods for comparing a character or graphic image captured by detector 40 with predetermined characters or images are known, including methods such as template matching or feature extraction (topological feature analysis). The images recognized may include bar codes as well as human-readable natural language characters and simple or complex graphic images. A simple method of template matching, for example, is described in Dana H. Ballard et al. "Computer Vision" (Prentice-Hall, Inc., Englewood Cliffs, N.J., 1982) Section 3.2.1 (p. 65 ff.). Other methods of verifying images are discussed in Azriel Rosenfeld et al. "Digital Picture Processing" (Academic Press, New York, N.Y., 1976) particularly in Chapter 10 Section 10.4 and in references cited there (pp. 404–450). More recently developed methods are described in the extensive patent and publication literature of optical character recognition and pattern recognition. See for example J. R. Ullman, "Advances in Character Recognition" (pp. 197–236) in K. S. Fu, Ed. "Applications of Pattern Recognition" (CRC Press, Inc., Boca Raton, Fla., 1982) and "Proceedings of 10th International Conference on Pattern Recognition" (IEEE Computer Society Press, Los Alamitos, Calif., 1990) Vol. 1 and 2, especially Vol. 1 pages 443–473 and 551–582, and other proceedings of that conference series.

It will be understood that microcomputer 100 may be programmed for its various modes of operation by hardware mode-selection switches (not shown), or by loading appropriate software instructions into its program memory through input/output port 120. For example, microcomputer 100 may be programmed to compare two multiplexed images in real time, pixel by pixel, such as a fluorescent image and a visual/IR image, using the software equivalents of a sample and hold circuit and a comparator circuit. Alternatively, these functions can be provided in conventional circuit hardware. With appropriate timing, and with optical alignment of two detectors 40, two multiplexed images may be compared in real time, pixel by pixel, without use of memory 90. The two images may be a conventional image detectable with visible-light illumination and a fluorescent image detectable under UV illumination, or two distinct fluorescent images having different fluorescent wavelengths, both made detectable by UV illumination. Mode-selection switches, mentioned above, may be used to select an image-comparison mode to operate in this manner. The optical alignment of detectors 40 for image-comparison operation may include a predetermined optical axis offset between two or more detectors. In the simplest embodiment of such a system, the offset is zero, and two or more images must be printed in registration, i.e. each image printed accurately aligned with the other(s), within a predetermined tolerance. If they are registered within the required tolerance, the system produces a positive indication of authenticity, via indicators 110.

Another mode of operation is an offset-image-comparison mode. This mode may be selected by mode-selection switches or under control of a stored program of microcomputer 100. A predetermined offset may be switched on or off by a user. Yet another mode of operation selectable by switches or by stored-program control is a "missing-link" image mode. In this mode of operation, one image contains an incomplete image which is missing certain elements or segments of a complete image. That incomplete image may be a visible image or one made visible only under UV illumination. For a "missing link" mode of operation, at least one additional image must be printed which contains the missing segments, filling in a complete image. Only under UV illumination will the complete image be detected by detectors 40 and recognized by recognition logic 70.

If the two images have opposite contrast (i.e. one has relatively bright indicia on a darker background and the other has dark indicia on a brighter background), then one image is reversed by recognition logic 70 before the two images are combined. The two images may then be combined by a registration operation and an addition operation. For binary images, the addition may be a logical non-exclusive OR operation. Both images may contain a common element of a convenient design such as a cross to be used for registration.

Conventional switches may be used in conventional arrangements to actuate movement of optical filters 50 into and out of illumination portion 15 and/or return portion 16 of the optical path. These filter movements may be controlled by microcomputer 100 through its stored program instructions, instead of or in addition to switches manually operated by a user.

Figure 2:
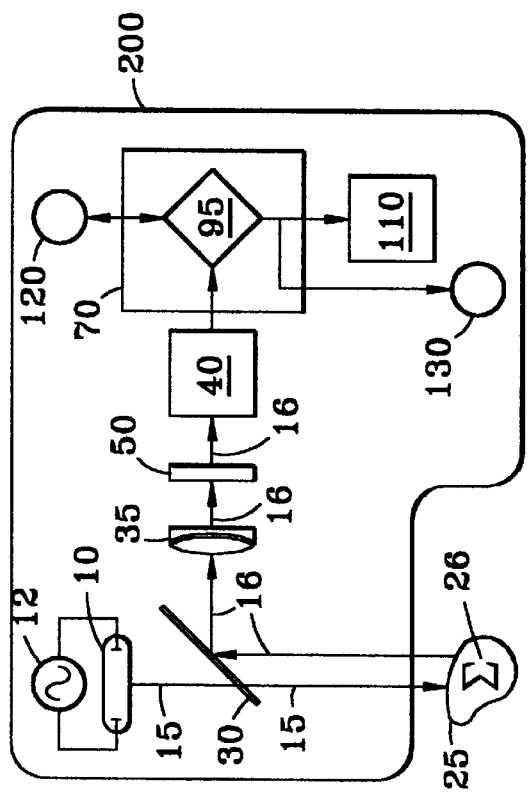
FIG. 2 is a schematic diagram illustrating an embodiment of the authentication system.

FIG. 2 is a schematic diagram illustrating a first physical embodiment of the authentication system. The system has a housing 200. Housing 200 holds and encloses other elements of the system, maintaining optical alignment, shielding the optical paths from stray light, and protecting the user from unnecessary exposure to UV light. Housing 200 should enclose at least the illumination portion optical path portion 15, UV source 10 and visible/IR source 20, splitter 30, filters 50 if any, and detector 40, and may enclose all other elements as well. For some applications it may be convenient to enclose only the illumination portion optical path 15, source(s)10 and/or 20, splitter 30, filters 50 if any, and detector 40 in housing 200, and to house the remaining elements of the system separately, connected to the elements in housing 200 with a cable or with wireless transmitter and receiver means (not shown) such as radio, ultrasonic or infrared. Of course elements within housing 200 and subject to illumination by illumination portion optical path 15 or by any scattered UV light should not themselves be fluorescent in a spectral range to be detected.

In FIG. 2 UV source 10 is energized by energizing circuit 12, which may incorporate components making UV source 10 a self-modulating lamp as discussed above with reference to FIG. 1. Light propagating along illuminating optical path portion 15 from source 10 illuminates the article 25 to be authenticated, which may carry authenticating indicia 26 printed on it in accordance with methods of the invention. Light returning along return optical path portion 16 is separated from illuminating portion by beam splitter 30 or equivalent means. Beam splitter 30 may be a partially reflective mirror or a suitable prism transparent to UV light in the direction of illuminating portion optical path 15. Return portion optical path 16 is focused by focusing element 35 so as to produce an image of article 25 at detector 40. Optical filter 50 may be used to select portions of the optical spectrum to be detected.

Detector 40 is preferably a CCD array detector such as a CCD video camera. For some applications, however, detector 40 may be a simpler and less expensive linear detector array as discussed above with reference to FIG. 1. It is important that detector 40 in combination with other elements of the invention produce sufficient graphic or character data with sufficient resolution and contrast for optical character recognition and/or image comparison by recognition logic 70. In FIG. 2, detector 40 is of a type producing a digital output. Recognition logic 70 may be implemented by use of a digital signal processor (DSP) 95, as shown in FIG. 2. In this embodiment digital signal processor 95 performs combined functions of microcomputer 100 and recognition logic 70 of FIG. 1, and may also incorporate memory 90. If detector 40 were of a type producing analog outputs, DSP 95 could also perform the function of analog-to digital conversion 80 shown in FIG. 1. DSP 95 may be a DSP56000, available from Motorola, Inc. for example, along with appropriate support circuitry.

Recognition logic 70 connects to an input/output port 120, through which the program under which DSP 95 operates may be loaded. Predetermined character and/or graphic image data may also be loaded through port 120, and this or other information may be read out. The other information to be read out may include statistical information gathered by DSP 95 over a period of time, over a number of characters or images tested, or over a number of authenticity determinations made. Recognition logic 70 also connects to indicators 110 and electrical output port 130. When recognition logic 70 has completed a character-recognition operation or image-comparison operation (or set of such operations) and reached an authentication result (positive or negative), the authentication result is displayed on indicators 110 and/or transmitted to electrical output port 130. Output port 130 may be a relay output, a standard logic output such as TTL, a current loop output, or the like to control other apparatus outside the authentication system apparatus. Indicators 110 may consist of light-emitting diodes, a liquid-crystal display, a cathode-ray tube video display or the like to convey an authentication result to a human user of the apparatus. In the simple embodiment of FIG. 2, no scanner 60 is used, and no separate memory 90 is used. This embodiment can be used, for example, in an "overlay method," described in detail below.

Figure 3:
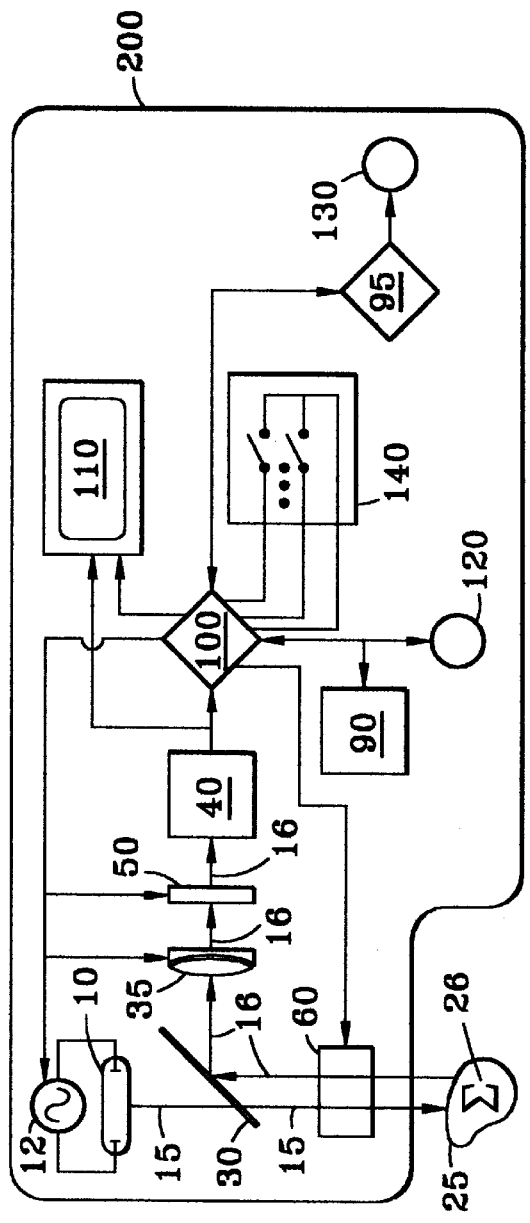
FIG. 3 is a schematic diagram illustrating another embodiment of the authentication system.

FIG. 3 is a schematic diagram illustrating a second physical embodiment of the authentication system. The embodiment of FIG. 3 combines many of the same elements as in the simpler embodiment of FIG. 2 along with additional elements to provide a more flexible authentication system. A housing 200, UV light source 10, energizing circuit 12, beam splitter 30, focusing optical element 35, optical filter 50, detector 40, input/output port 120 and electrical output port 130, all of these perform the same functions as the corresponding elements in FIG. 2. In FIG. 3, microcomputer 100 controls the overall operation of the authentication system. Control switches 140 allow selection of various operating modes by the user. Memory 90 stores predetermined character or graphic image data, and image data acquired by detector 40, under control of microcomputer 100. The function of recognition logic 70 is performed by the combination of microcomputer 100 and DSP 95. Operating parameters of several elements are controlled by microcomputer 100. A modulation frequency of UV source 10, for example may be controlled by microcomputer 100 by varying the frequency of trigger pulses or by switching various capacitors into a resonant circuit including the lamp of UV source 10. The axial position of focusing optical clement 35 may be controlled by actuating a stepper motor with pulses from microcomputer 100. The positions of filters 50 may be similarly controlled to move filters 50 into or out of an optical path. The operation of detector 40 may be controlled by microcomputer 100, including synchronizing an image acquisition operation with the operation of UV source 10. Scanner 60 scans article 25 for those applications that require scanning, and its frequencies and amplitudes of scanning may be controlled by microcomputer 100. In the embodiment of FIG. 3, indicator 110 may display a processed image and/or a raw, unprocessed image of article 25 or indicia 26.

It will be understood that microcomputer 100 may be programmed for its various modes of operation by hardware control switches 140 selecting the various modes, or by loading appropriate software instructions into its program memory through input/output port 120.

Figure 4:
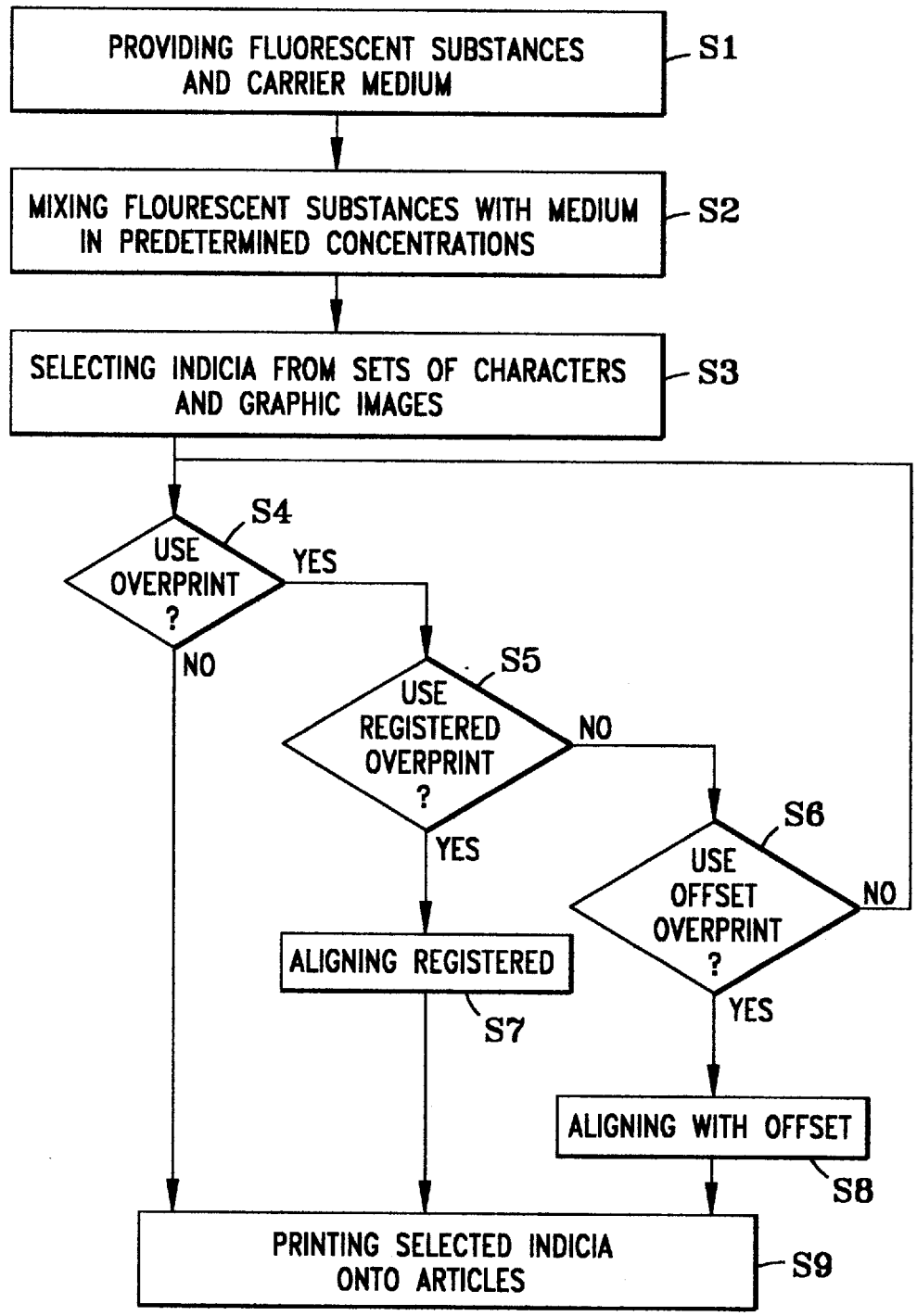
FIG. 4 is a flow chart illustrating a process for marking articles for authentication.

FIG. 4 is a flow chart illustrating a process for marking articles for authentication in accordance with the invention. First (S1), a suitable carrier medium and predetermined fluorescent substances are provided. The carrier medium may be a non-fluorescent transparent solvent or liquid plastic. The fluorescent substances are preferably substances which fluoresce in the blue portion of the optical spectrum at about 465 nanometers wavelength, substances which fluoresce in the green portion of the optical spectrum at about 510 nanometers wavelength, substances which fluoresce in the yellow portion of the optical spectrum at about 530 nanometers wavelength, and mixtures of those substances, which may be easily distinguished using readily available optical filters. Fluorescent substances are preferred which fluoresce in the portions of the optical spectrum between 455 and 475 nanometers wavelength, between 500 and 520 nanometers wavelength, between 520 and 540 nanometers wavelength, and between 580 and 680 nanometers wavelength, and their mixtures (in the same indicia) or combinations (in different indicia). Suitable substances are Angstrom No. 5, Angstrom No. 4, and Angstrom No. 6, available from Angstrom Technologies, Inc., which fluoresce in the first three above-mentioned spectral ranges respectively, and pentacene ($C_{22}H_{14}$) which fluoresces in the fourth above-mentioned spectral range. Fluorescent substances to be used in the methods of this invention may include substances and chemical compositions as described in U.S. Pat. No. 4,642,526 by Hopkins, the disclosure of which is hereby incorporated by reference. It is especially preferred to provide fluorescent substances without heavy metals (i.e. having metals, if any, with atomic numbers less than or equal to 20). These are safer and less likely to harm the environment than substances containing heavy metals. It is also especially preferred to provide substances that have sufficiently short extinction times to enable fast scanning for capture of complex indicia without undue loss of resolution or smearing of details.

The fluorescent substances are mixed (step S2) with the carrier medium in predetermined concentrations. Preferred concentrations are less than 10% by weight, and even more preferred, less than 1% by weight.

In step S3, indicia are selected from predetermined sets of characters or graphic images suitable for recognition. The predetermined characters preferably include a font of characters standardized for optical character recognition. Examples of such standardized character sets are OCR-A, OCR-B, E-13B, OCR-A Eurobanking and OCR-B Eurobanking. For mail sorting or authentication, standardized postal bar code indicia such as the "PostNET" code are preferred. Preferred indicia for other authentication applications are more complex than bar codes or simple arrays of dots and/or lines. However, it should be noted that the methods of this invention are not limited to Roman alphabet fonts or fonts especially designed for OCR, but may be used with a wide variety of character indicia, including characters of foreign languages such as Cyrillic, Chinese, Japanese, Hebrew and Arabic language characters, and an even wider variety of arbitrarily designed graphic images.

At this point in the process, a series of decisions are made which determine whether indicia to be printed will be aligned with previously printed marks. The first decision (step S4) is whether an overlay method will be used. If not, the selected indicia are printed without alignment (step S9). If an overlay method is to be used, the decision made in step S5 determines if it is to be registered overlay. If so, the selected indicia are aligned in registration with previously printed indicia (step S7), and then printed (S9). If the method is to be an offset overlay (decided in step S6), then the selected indicia are aligned with a predetermined offset (S8), and then printed (S9). Many methods of alignment or registration of printed indicia are known in the art, including the methods used to register the various color levels in color offset printing.

The methods of the invention as illustrated by the method of FIG. 4 may be used on a variety of articles, including articles made of paper, synthetic paper, tamper-resistant paper, cardboard, fabric, plastic film, ceramic, metal and glass.

The invention will be further clarified by considering the following examples, which are intended to be purely exemplary of various ways to use the invention.

The authentication system is easy to use and flexible in its uses. In a first phase of using the invention, the articles to be authenticated are marked by a process in accordance with the flow diagram of FIG. 4. The images may be graphic representations of a company's logo, for example. Or the indicia may be a series of English alphanumeric characters coding some unique characteristics of the article being marked. In a second phase of using the authentication system, a determination is made whether particular articles have been so marked.

In one method of using the authentication system, the graphic images and/or characters to be recognized are stored in memory 90 using input/output port 120. Articles to be tested for authenticity are moved past the optical input of the authentication system if it is of a type not having an integral scanner 60. If the authentication system does have an integral scanner 60, relative motion of the system and the articles is not needed (nor is relative motion desirable). In either case, UV source 10 illuminates the articles, and detector 40 captures an instantaneous image. Recognition logic 70 will automatically indicate authentication only if the detected graphic image or characters match the stored image data to within predetermined criteria and their tolerances.

In another method of using the authentication system (here termed "overlay method"), there are again two phases. In the first phase, indicia selected from a predetermined set of images or characters recognizable by the authentication system are printed on articles with ordinary visible ink. These indicia may represent a serial number, for example. The same images or characters are printed on the same articles with fluorescent ink prepared as described above. Preferably the second printing is printed over the first (visible) printing in registration with the visible printing. Thus it would not be apparent that the article carried additional non-visible markings. Useful alternatives include printing indicia with ink fluorescent in one preselected wavelength over identical indicia fluorescent in a different preselected wavelength, or printing first fluorescent indicia over either visible or second fluorescent indicia with a predetermined registration offset—i.e. shifted by a predetermined distance and direction from the first printing. The latter may be called an "offset overlay method." In a further application of the offset overlay method, the overlay offset and the two overlaid images may be selected to produce a predetermined stereo three-dimensional image when viewed from normal near-point reading distance (25 cm.) by a human observer through suitable filters differing for the observer's two eyes. This application ("stereo offset overlay") allows a human observer to accomplish a "first-order" authentication—i.e. an authentication with less precision and certainty than that performed by methods using the apparatus of this invention. First-order authentication may be conveniently used at a point-of-sale, immigration or customs checkpoint, etc. for a rapid informal check on an article's authenticity. As there is some variation among observers with respect to inter-ocular spacing, and in their ability to easily assimilate variously spaced stereo pairs of images presented separately to their eyes, there is a range of offsets that provides three-dimensional appearance, which will vary somewhat in apparent depth depending on the observer. The stereo pair of images may be of the type commonly called "random dot stereograms," in which no structure is evident to the human eye until the stereogram images are fused to produce a three-dimensional effect.

This completes the first phase of using the system in the overlay method. The second phase of the overlay method is using the authentication system to determine if the indicia are authentic. For this second phase, the authentication system is switched to "overlay detection" mode. In this mode the authentication system scans the article first with visible/IR light and (after conversion to digital form) stores the visible/IR image data. It then scans the same article with UV light and stores the (digitally converted) fluorescent image data. These two scanning, detection, conversion and storage sequences can be quasi-simultaneous operations by using the multiplexing option described above. The recognition logic compares the digital data stored from visible/IR and fluorescent image scans (performing a software registration if necessary), and indicates a positive authentication result if and only if the two images agree within the programmed tolerance. If the images have been intentionally printed with a predetermined offset (offset overlay method), then the recognition logic is programmed to test for the predetermined registration offset (to within a predetermined tolerance) as well as for correspondence of the indicia. This offset testing may be done, for example, by first utilizing known methods of registering similar images (such as maximizing a cross-correlation coefficient). Then the offset distance and direction required to achieve best registration is determined. The test is completed by comparing that offset with the predetermined offset. The same method may be used for automatic testing of stereo offset overlay images. Other stereo image interpretation methods may also be used (such as those discussed in W. Luo and H. Maitre at pages 60–64 in Vol. 1 of "Proceedings 10th International Conference on Pattern Recognition" cited above, and in other papers in those proceedings and those of other conferences in that series).

In a variation of the overlay methods described above (here termed "missing link overlay"), the two overlaid images may comprise a complementary pair in which detailed elements of one member of the pair complete a recognizable image by filling in detail elements missing from the other member of the pair. One member of the pair is again printed with visible ink or a first fluorescent ink, and the other member of the pair is printed in a fluorescent or a second fluorescent ink respectively. For example indicia in one member of the pair may comprise portions of characters of a complete English word or phrase, and the other indicia may comprise the remaining portions of those characters, such that either image alone is not readily recognizable by a human observer or by a conventional OCR system, but when the two indicia are combined by the system of this invention, the complete word or phrase may be recognized. A simple example of non-character missing-link images is a pair of images, each containing different portions of a complete recognizable object, such as a bicycle. Thus the missing link overlay method also allows first-order authentication by a human observer.

It will be noted that some of the methods of using the invention may require (as part of the automatic image acquisition process or recognition process), contrast reversal of an image or of one image of a pair, while not requiring contrast reversal of the other image of a pair. Thus for example, while indicia printed with visible ink may be recognized by conventional OCR apparatus, other indicia printed with fluorescent ink may have bright indicia against a darker background, and thus may require contrast reversal before recognition by similar recognition logic. With digital representation of the detected indicia, any required contrast reversal is easily incorporated into the program of microcomputer 100 or DSP 95.

Other embodiments of the invention will be apparent to those skilled in the art from a consideration of this specification or from practice of the invention disclosed herein. For example, while FIGS. 1, 2 and 3 show a beam splitter 30 separating illuminating optical path portion 15 from return optical path portion 16, these portions may be separated instead by an opaque wall or septum which may be an integral part of housing 200, or one or both optical path portions may be confined to separate optical fibers. If it is required to bend illuminating optical path portion 15 and/or return optical path portion 16, that optical path may be bent by other conventional means such as mirrors, prisms, optical fibers, or light pipes. Various optical components shown in the drawings may be rearranged while still performing substantially the same functions. For example focusing optical element 35 may be a mirror or holographic optical element instead of the conventional lens illustrated in FIG. 2. Also, optical element 35 may be re-positioned to operate on both illuminating portion 15 and return portion 16 of the optical path.

While uses of the authentication system and methods have been described in terms of authentication, it will be clear that the same apparatus and methods may be useful for applications other than authentication, such as mail sorting, quality control of articles during their manufacture, or identification of articles during shipping, repair, or cleaning, etc. It is intended that the specification and examples be considered as exemplary only, with the true scope and spirit of the invention being defined by the following claims.

Having described my invention, I claim:

1. A process for marking articles for authentication, comprising the steps of:
    a) providing one or more predetermined fluorescent substances,
    b) providing a transparent non-fluorescent carrier medium in which said fluorescent substances are miscible,
    c) mixing said fluorescent substances in predetermined concentrations in said carrier medium,
    d) selecting indicia from a predetermined set of characters and graphic images readable by optical character recognition means and image comparison means respectively, and
    e) printing said selected indicia on said articles with said carrier medium containing said predetermined concentrations of said fluorescent substances, said selected indicia being printed in predetermined offset from registration with indicia previously printed on said article, and said predetermined offset being chosen such that said selected indicia and said previously printed indicia in combination form a stereogram when viewed from a standard near-point reading distance of 25 centimeters.

2. A process as in claim 1 wherein said providing steps (a) and (b) and said mixing step (c) produce an ink suitable for ink-jet printing, and said printing step (e) is performed by using an ink-jet printer.

3. A process as in claim 1 wherein said providing steps (a) and (b) and said mixing step (c) produce a toner substance suitable for laser printing, and said printing step (e) is performed by using a laser printer.

4. A process as in claim 1 wherein said providing steps (a) and (b) and said mixing step (c) produce an ink suitable for rubber stamping, and said printing step (e) is performed by using an ink pad and rubber stamp.

5. A process as in claim 1 wherein said providing steps (a) and (b) and said mixing step (c) produce a toner substance suitable for xerographic copying, and said printing step (e) is performed by using a xerographic copier.

6. A process as in claim 1 wherein said providing steps (a) and (b) and said mixing step (c) produce an ink suitable for offset lithography, and said printing step (e) is performed by using an offset printing press.

7. A process as in claim 1 wherein said predetermined set of characters and images includes a font of characters standardized for optical character recognition.

8. A process as in claim 1 wherein said predetermined set of characters and images includes a font selected from the list characterized by the standards identified as OCR-A, OCR-B, E-13B, OCR-A Eurobanking, OCR-B Eurobanking, and PostNET.

9. A process as in claim 1 wherein said indicia previously printed on said article are printed with non-fluorescent ink.

10. A process as in claim 1 wherein said selected indicia and said previously printed indicia each form incomplete images, and their combination forms a single image recognizable by said image comparison means.

11. A process as in claim 1 wherein said predetermined fluorescent substances are selected from a set consisting of:
   a) substances which fluoresce in the blue portion of the optical spectrum at about 465 nanometers wavelength,
   b) substances which fluoresce in the green portion of the optical spectrum at about 510 nanometers wavelength,
   c) substances which fluoresce in the yellow portion of the optical spectrum at about 530 nanometers wavelength,
   d) substances which fluoresce in the orange and red portion of the optical spectrum at about 600 to 680 nanometers wavelength,
   e) mixtures thereof, and
   f) combinations thereof.

12. A process as in claim 1 wherein said predetermined fluorescent substances are selected from a set consisting of:
   a) substances which fluoresce in the portion of the optical spectrum between 455 and 475 nanometers wavelength,
   b) substances which fluoresce in the portion of the optical spectrum between 500 and 520 nanometers wavelength,
   c) substances which fluoresce in the portion of the optical spectrum between 520 and 540 nanometers wavelength,
   d) substances which fluoresce in the portion of the optical spectrum between 580 and 680 nanometers wavelength,
   e) mixtures thereof, and
   f) combinations thereof.

13. A process as in claim 1 wherein said predetermined fluorescent substances consist of non-toxic substances.

14. A process as in claim 13 wherein said non-toxic substances comprise non-toxic substances containing metals, if any, of atomic number less than or equal to 20.

15. A process as in claim 1 wherein said predetermined fluorescent substances have fluorescence extinction times less than 10 milliseconds.

16. A process as in claim 15 wherein said predetermined fluorescent substances have fluorescence extinction times less than 1 millisecond.

17. A process as in claim 16 wherein said predetermined fluorescent substances have fluorescence extinction times less than 10 microseconds.

* * * * *